United States Patent
Hei

(10) Patent No.: US 7,444,779 B2
(45) Date of Patent: Nov. 4, 2008

(54) FISH HANDLING DEVICE

(76) Inventor: Pihi Hei, Maraehoko Bay Retreat, State Highway 35, Rd 3, Opotiki (NZ) 3162

( * ) Notice: Subject to any disclaimer, the term of this patent is extended or adjusted under 35 U.S.C. 154(b) by 0 days.

(21) Appl. No.: 11/529,329

(22) Filed: Sep. 29, 2006

(65) Prior Publication Data

US 2007/0074445 A1    Apr. 5, 2007

(30) Foreign Application Priority Data

Sep. 30, 2005    (NZ) ...................... 542114

(51) Int. Cl.
*A01K 97/18* (2006.01)
*A01K 97/14* (2006.01)
*A01K 81/04* (2006.01)

(52) U.S. Cl. ...................... 43/53.5; 43/5; 43/6; 294/26; 294/61; 7/106; 7/161; 7/167

(58) Field of Classification Search ............ 43/5, 43/6, 53.5; 294/19.3, 61, 19.1, 26; 7/106, 7/161, 167

See application file for complete search history.

(56) References Cited

U.S. PATENT DOCUMENTS

| | | | | |
|---|---|---|---|---|
| 148,687 A | * | 3/1874 | Funk | 7/167 |
| 164,575 A | * | 6/1875 | McCall | 7/167 |
| 305,521 A | * | 9/1884 | Kerner | 7/167 |
| 545,960 A | * | 9/1895 | Langford et al. | 43/5 |
| 841,099 A | * | 1/1907 | Anderson | 7/106 |
| 974,316 A | * | 11/1910 | Viera | 7/161 |
| 1,199,705 A | * | 9/1916 | Lucas et al. | 294/26 |
| 1,298,961 A | * | 4/1919 | Kelly | 43/6 |
| 1,373,310 A | * | 3/1921 | De Luca | 7/167 |
| 1,755,646 A | * | 4/1930 | Halstead | 294/61 |
| 1,813,292 A | * | 7/1931 | Hord | 294/61 |
| 1,818,474 A | * | 8/1931 | Gough | 7/106 |
| 2,050,194 A | * | 8/1936 | Pflueger | 43/53.5 |
| 2,362,137 A | * | 11/1944 | Kagan | 294/26 |
| 2,718,082 A | * | 9/1955 | Limacher | 43/53.5 |
| 2,877,045 A | * | 3/1959 | Payne | 43/5 |
| 2,963,811 A | * | 12/1960 | Nelson | 43/6 |
| 2,984,931 A | * | 5/1961 | Shaw | 43/53.5 |
| 3,015,180 A | * | 1/1962 | McClure | 43/6 |
| 3,115,722 A | * | 12/1963 | Mann | 43/53.5 |
| 3,397,479 A | * | 8/1968 | Tyjewski | 43/53.5 |
| 3,447,173 A | * | 6/1969 | Kleiman | 7/106 |

(Continued)

FOREIGN PATENT DOCUMENTS

FR    2844148 A1 *    3/2004

(Continued)

*Primary Examiner*—Darren W Ark
(74) *Attorney, Agent, or Firm*—Young & Thompson

(57) ABSTRACT

A hand-held fish handling device includes a shaft having one pointed end, useful in entering the mouth of a fish and then retrieving a swallowed hook from the stomach of a fish. The other end of the shaft has a multi-purpose tool fastened thereon; the tool is able to be used as a pithing device, as an external hook remover, and as a gaff. A hand grip enclosing the center of the shaft may be brightly colored and of high buoyancy to aid in retrieving a dropped device. One version of the device employs a wooden shaft and the attached multi-purpose tool is made of a bent metal rod, sharpened at both ends.

3 Claims, 2 Drawing Sheets

U.S. PATENT DOCUMENTS

Figure 3:
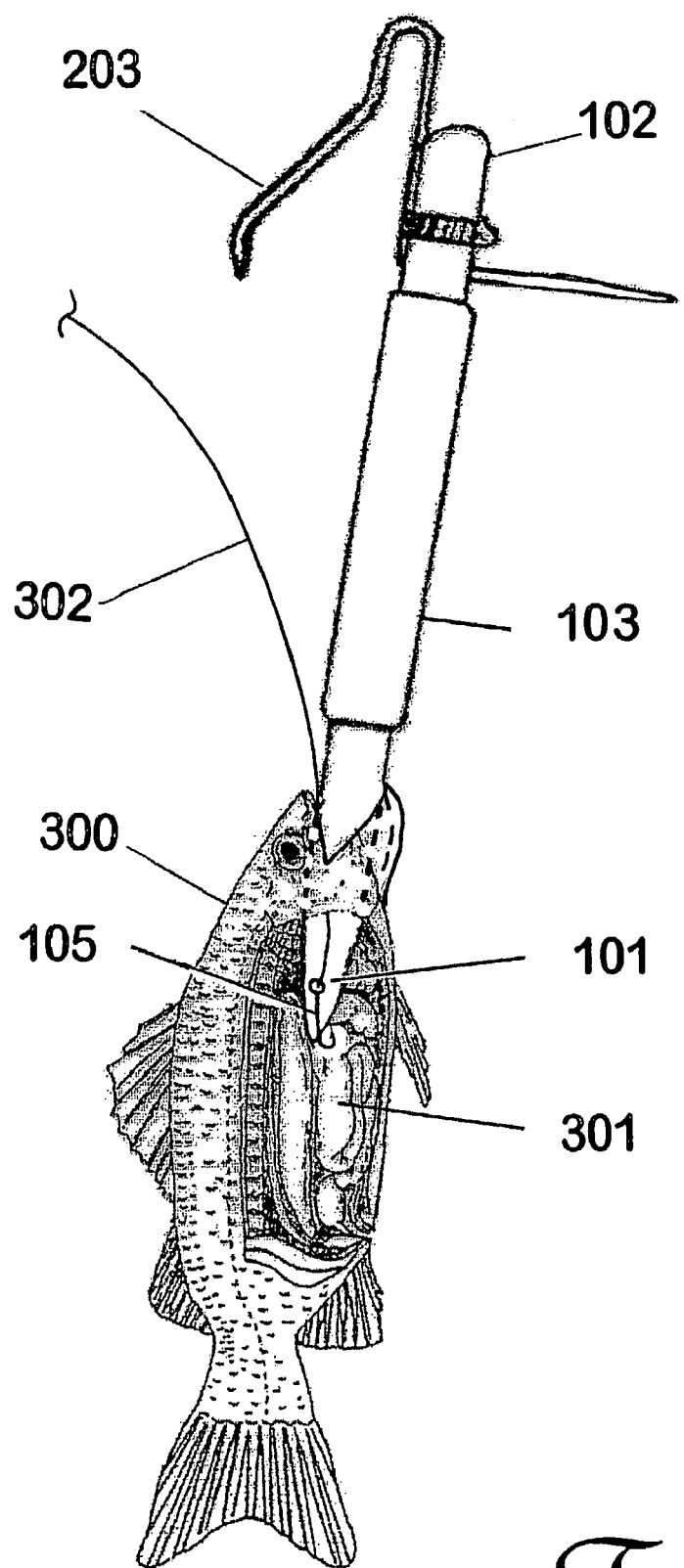

| | | | | |
|---|---|---|---|---|
| 3,449,007 | A * | 6/1969 | White | 294/26 |
| 3,603,021 | A * | 9/1971 | Nunley | 43/53.5 |
| 3,670,448 | A * | 6/1972 | Wehmeyer | 43/53.5 |
| 3,718,359 | A * | 2/1973 | Omdoll, Jr. | 294/26 |
| 3,811,217 | A * | 5/1974 | Watkins | 43/53.5 |
| 3,820,274 | A * | 6/1974 | Drenzyk | 43/53.5 |
| 3,823,971 | A * | 7/1974 | Golden | 294/26 |
| 3,824,165 | A * | 7/1974 | Miranda | 7/161 |
| 3,848,689 | A * | 11/1974 | Hilterhaus | 294/26 |
| 3,863,377 | A * | 2/1975 | Leonard | 43/6 |
| 3,888,038 | A * | 6/1975 | Howell | 43/53.5 |
| 3,955,302 | A * | 5/1976 | Tudisco | 43/6 |
| 3,978,605 | A * | 9/1976 | Maruniak | 43/5 |
| 4,043,067 | A * | 8/1977 | Konucik et al. | 43/6 |
| 4,118,883 | A * | 10/1978 | Watkins | 43/53.5 |
| 4,263,864 | A * | 4/1981 | Carter et al. | 294/26 |
| 4,691,465 | A * | 9/1987 | Dooley | 43/5 |
| 4,739,573 | A * | 4/1988 | Robertson | 43/5 |
| 4,769,939 | A * | 9/1988 | Gonska et al. | 43/5 |
| 4,881,338 | A * | 11/1989 | Lung | 43/5 |
| 5,092,074 | A * | 3/1992 | Zincke | 43/53.5 |
| 5,136,744 | A * | 8/1992 | Allsop et al. | 7/106 |
| 5,274,948 | A * | 1/1994 | Harrison et al. | 43/53.5 |
| 5,365,688 | A * | 11/1994 | Yong-Set | 43/5 |
| 5,557,874 | A * | 9/1996 | Pietrandrea et al. | 7/106 |
| 5,685,586 | A * | 11/1997 | Miller | 294/26 |
| 5,809,599 | A * | 9/1998 | Frazer | 7/167 |
| 5,934,009 | A * | 8/1999 | Trahan | 43/53.5 |
| 5,960,504 | A * | 10/1999 | Dougherty | 7/106 |
| 6,026,607 | A * | 2/2000 | Bukowski | 43/53.5 |
| 6,045,234 | A * | 4/2000 | Leeds | 43/53.5 |
| 6,397,513 | B1 * | 6/2002 | Reed | 43/53.5 |
| 6,857,217 | B1 * | 2/2005 | Herbst et al. | 43/5 |
| 7,144,128 | B2 * | 12/2006 | Brauner | 43/53.5 |
| 7,254,854 | B2 * | 8/2007 | Yonenoi | 7/106 |
| 2003/0029075 | A1 * | 2/2003 | Hebard | 43/53.5 |
| 2004/0025408 | A1 * | 2/2004 | Newman | 43/53.5 |
| 2005/0278865 | A1 * | 12/2005 | West | 7/106 |
| 2006/0064916 | A1 * | 3/2006 | Shiflett | 43/6 |

FOREIGN PATENT DOCUMENTS

| | | | |
|---|---|---|---|
| JP | 4-237448 A | * | 8/1992 |
| JP | 2000-106803 A | * | 4/2000 |

* cited by examiner

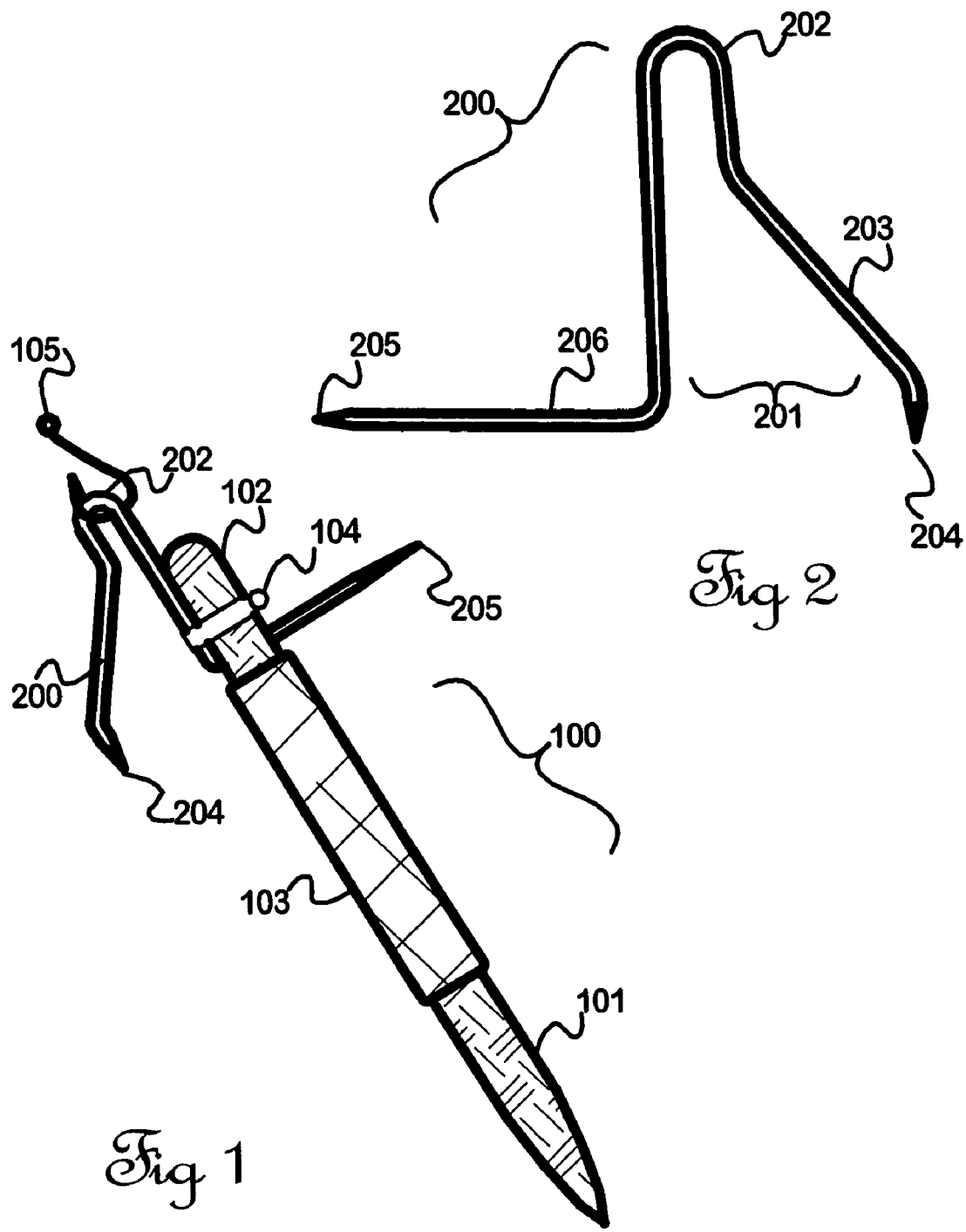

FISH HANDLING DEVICE

FIELD

This invention relates to gaffs for use by fishermen and more particularly to tools that help for example in the removal of hooks from landed fish.

BACKGROUND

Gaffs for use by fishermen are used as tools during the landing of hooked or netted fish and a wide variety of such tools exist. The inventor has developed the present invention in particular to help in the processing of landed fish, for quickly killing the fish and in the removal of hooks from internal or external sites in fish caught by a baited hook. Some of these hooks will have been swallowed and their removal has in the past caused difficulty.

PROBLEM TO BE SOLVED

Particular problems to be solved include (a) simple location of swallowed hooks and (b) quick, humane removal of swallowed hooks, and (c) a need for a one-hand operation, since the fisherman's other hand may be vital for maintaining balance or position on a pitching boat or precarious fishing spot, or for holding the fish.

OBJECT

It is an object of this invention to provide an improved type of gaff, or at least to provide the public with a useful choice.

STATEMENT OF INVENTION

In a first broad aspect this invention provides a hand-held fish handling device including a shaft having a central axis, a first pointed end and a second rounded end bearing a multi-purpose tool that is firmly secured to the shaft at or near the second end.

Optionally a hand grip made of a resilient or an easily gripped material is located about the middle of the shaft, and preferably this hand grip is made of a material of low specific gravity so that the hand-held fish handling device will float in water if dropped.

Preferably the shaft is made of wood or an equivalent strong, light material including at least one selected plastics material.

Preferably the shaft is about 30 to 50 cm in length although the length may be in proportion to the type of fish to be caught.

Preferably the multi-purpose tool is made from a rod of durable material pointed at each end, and bent in a particular manner and firmly attached to the shaft so that a first pointed end extends in a perpendicular direction from the central axis of the shaft and at or near the second rounded end of the shaft, and so that a second pointed end, which is located on an opposite side of the shaft to that of the first pointed end, is directed towards the pointed end of, and parallel to the axis of the shaft and supported on a looped portion of the metal rod; the loop having a base directed away from the point and a proximal and a distal arm; the proximal arm being fixed against the second rounded end of the shaft and the distal arm being bent outwardly from the shaft so that the loop widens as it approaches the second pointed end.

Preferably the multi-purpose tool is made of a metal such as steel or stainless steel.

In a second broad aspect the hand-held fish processing device is capable of being held and used with one hand by a user.

In a first related aspect a method for using the hand-held fish processing device as a gaff for landing a fish caught by a fishing line is to hold the device with the metal tool towards the fish and to use the loop of the metal tool to encircle the fish and thereby take control of the fish and bring the fish on to a surface if available.

In a second related aspect a method for using the hand-held fish processing device as a device for quickly killing a fish caught by a fishing line is to hold the device with the metal tool towards the fish and to penetrate the brain of the fish with the first pointed end of the metal tool and thereby pith the fish.

In a third related aspect a method for using the hand-held fish processing device as a device for removing a hook from a fish caught by a fishing line is to hold the device with the loop of the metal tool towards the fish and to intercept the hook (if not swallowed) around the base of the loop and then to twist the hand-held fish handling device about the hook so that the hook is removed from the fish.

In a fourth related aspect a method for using the hand-held fish processing device for use in locating the hook (if swallowed) in a landed fish caught by a fishing line is to insert the first pointed end of the shaft into the mouth, oesophagus or stomach of the fish, following a trace of the fishing line until the hard hook can be felt, then twisting the point around the trace and hook, and pulling the hook out.

PREFERRED EMBODIMENT

The description of the invention to be provided herein is given purely by way of example and is not to be taken in any way as limiting the scope or extent of the invention.

Throughout this specification, unless the text requires otherwise, the word "comprise" and variations such as "comprising" or "comprises" will be understood to imply the inclusion of a stated integer or step or group of integers or steps but not the exclusion of any other integer or step or group of integers or steps.

DRAWINGS

FIG. 1: is a diagram showing the invention, in side view.

FIG. 2: is a scale diagram showing the multi-purpose tool.

FIG. 3: shows how the device can be inserted to enter the stomach of a fish in order to retrieve a swallowed hook.

EXAMPLE 1

When one catches a fish with a hook and line, the most urgent steps for processing the fish include gaining physical control over the fish and restraining it while bringing it out of the water, immobilising the fish usually by pithing its brain, and retrieving the hook from the fish so that the hook can be rebaited and returned to the water. The hook may be caught in the jaw where it is accessible, or it may have been swallowed. Gutting the fish is an example of a further activity with which we are not concerned here.

This invention relates to a hand-held fish processing device analogous to, but an improvement over, a gaff. The device 100 (see FIG. 1) includes a shaft having a central axis, a first pointed end (101) and a second rounded end 102 inventively bearing a multi-purpose tool 200 that is firmly secured to the shaft at or near the second end. (In this example a hose clip 104 is used as a securing means, and the part of the tool having a pithing spike 205 is passed through a hole bored across the shaft 102).

Optionally a hand grip 103 made of a resilient or an easily gripped material (even if wet or slimy) is located about the middle of the shaft, and preferably this hand grip is made of a material of low specific gravity so that the hand-held fish handling or handling device will float in water if dropped.

The shaft 101 . . . 102 is usually made of wood (20 mm diameter doweling (cylindrical shaft) in the case of the prototype) although an equivalent strong, light material optionally being at least one suitable plastics material may be used.

Preferably the shaft is about 30 to 50 cm in length although the length (especially of the pointed end 101) may be modified in proportion to the type of fish to be caught. By way of example only, the prototype is 40 cm long.

The multi-purpose tool used on one end of the device is described more particularly in relation to FIG. 2, a scale drawing of a prototype tool. This tool 200 is made from a rod of durable material. The inventor used stainless steel although alternatives might be preferred for reasons of cost. The tool 200 is pointed at each end. Sharp end 204 is used in a relatively conventional gaffing purpose, along with the open loop generally indicated at 201, that is like an inverted "U" shape except that arm 203 is bent away from the axis of the shaft 101 . . . 102 so that the open loop converges to a relatively narrow bend at 202. This is useful for gathering in a line, Gaffing method of use. The base of the loop 202 is directed away from the point of the hand-held fish processing device. In combination with the widened opening at 201, this part of the multi-purpose tool can be used to capture a moving fish being drawn in by holding the device by the hand grip 103 and reaching out to the fish wherever it may be, (or to capture the fishing line leading to the fish, in the first instance) and hence to take control of the fish and bring the fish on to a surface if available so that it may be processed. Some fishermen resort to impaling the fish with the spike 204.

Hook extraction method of use (1). As shown in FIG. 1, this pointed tip 204, arm 203 and loop 202 may be used to pick up an externally visible hook 105 that has caught a fish, and with a twisting motion of the shaft, the hook may be extracted from the fish. A practised user will use the weight or momentum of the fish and can remove a hook with one quick twist.

Pithing the brain method of use. The other tip of the multi-purpose tool (205) is formed on the end of a straight section 206 of the rod and is used as part of the hand-held fish processing device after the fish has been landed to pith the brain of the fish and thereby despatch the fish as soon as possible. The actual mode of use can be described as a one-handed hammering motion.

Hook extraction method of use (2). A method for using the fish handling device when locating the hook (if swallowed) in a landed fish caught by a fishing line is to insert the first pointed end 101 of the shaft into the mouth, through the oesophagus and into the stomach 301 of the (diagrammatically opened) fish 300 as shown in FIG. 3. It is convenient to hold the trace 302 issuing from the mouth and feel any contact made between the hook and the pointed end 101 of the fish handling device through the trace and through the fingers. The user would make the pointed end of the device follow along a trace 302 of the fishing line until the hard hook 105 can be felt, then the user would twist the trace and hook around the pointed end, and having gained sufficient purchase on the hook, the user would pull the hook 105 out. Again the weight or momentum of the fish can assist in this procedure.

Variations

It is possible to make the entire device from injection-moulded plastics rather than the wood and metal of the prototype. Or, a plastics shaft could be moulded around a partly embedded steel tool using techniques well known to those skilled in the art.

The hand hold 103 could be made of a bright colour (yellow or fluorescent orange for example) in case the floatable device is dropped in the sea.

INDUSTRIAL APPLICABILITY AND ADVANTAGES

The inventor considers it important in practice that the hand-held fish processing device is capable of being held and used with one hand, as it in fact is. There are many situations when only one hand is available for using the device, for example because the fisherman's other hand is holding on to a railing of a pitching small boat, or is holding a fishing rod or a line.

Positive buoyancy is another advantage in case the device is accidentally dropped.

The device is relatively simple and therefore should be cheap.

The device should have a long life time. It is possible to re-sharpen the points.

Finally, it will be understood that the scope of this invention as described and/or illustrated herein is not limited to the specified embodiments. Those of skill will appreciate that various modifications, additions, known equivalents, and substitutions are possible without departing from the scope and spirit of the invention as set forth in the following claims.

I claim:

1. A hand-held fish handling device usable when landing and handling a caught fish, wherein the hand-held fish handling device comprising:
    a shaft having a central axis, a first end that is pointed, and a second rounded end; and
    a multi-purpose tool that is secured to the shaft at or near the second end, the device being capable of being held and used with one hand by a user,
    wherein the multi-purpose tool is made from a bent rod of durable material pointed at each end, the multi-purpose tool is firmly attached to the shaft; a first pointed end of the bent rod extends in a perpendicular direction from the central axis of the shaft and near the second rounded end of the shaft, and so that a second pointed end, which is located on an opposite side of the shaft to that of the first pointed end of the bent rod, is directed towards the pointed end of the shaft and lies in a plane parallel to the central axis of the shaft; a part of the bent rod supporting the second pointed end includes a "U"-shaped bent portion of the bent rod; the "U"-shaped bent portion having a base directed away from the first end of the shaft and a proximal and a distal arm; the proximal arm being aligned with the second rounded end of the shaft and the distal arm being bent outwardly from the shaft so that the "U"-shaped bent portion widens away from the base of the "U"-shaped bent portion and so that the "U"-shaped bent portion can be used to catch and confine a trace.

2. The device as claimed in claim 1, wherein the tool is made of a rod of a durable metal.

3. The device as claimed in claim 2, wherein the durable metal is steel or stainless steel.

* * * * *